United States Patent [19]

Clinton et al.

[11] Patent Number: 4,679,433
[45] Date of Patent: Jul. 14, 1987

[54] FLUID-GAUGING SYSTEMS

[75] Inventors: Peter Clinton, Crewe, Cheshire; Ronald V. Myers, Basingstoke, Hampshire; David Sinclair, Camberley, Surrey, all of England

[73] Assignee: Smiths Industries Public Limited Company, London, England

[21] Appl. No.: 847,461

[22] Filed: Apr. 3, 1986

[30] Foreign Application Priority Data

Apr. 3, 1985 [GB] United Kingdom ............... 8508741
Aug. 3, 1985 [GB] United Kingdom ............... 8519581

[51] Int. Cl.$^4$ ............................................. G01F 23/26
[52] U.S. Cl. .................................................. 73/304 C
[58] Field of Search ............................. 73/1 H, 304 C; 324/61 P; 331/65; 361/284; 340/620

[56] References Cited

U.S. PATENT DOCUMENTS

| 3,580,074 | 5/1971 | Wescott et al. | 73/304 C |
| 3,918,306 | 11/1975 | Maltby | 73/304 C |
| 4,149,231 | 4/1979 | Bukosky et al. | 73/304 C |
| 4,259,865 | 4/1981 | Myers | 73/304 C |
| 4,289,028 | 9/1981 | Wallman | 73/304 C |
| 4,383,444 | 5/1983 | Beaman et al. | 73/304 C |
| 4,412,450 | 11/1983 | Franz et al. | 73/304 C |
| 4,499,640 | 2/1985 | Brenton et al. | 73/304 C |
| 4,525,792 | 6/1985 | Clinton | 73/304 C |
| 4,583,402 | 4/1986 | Myers et al. | 73/304 C |

Primary Examiner—Richard R. Stearns
Attorney, Agent, or Firm—Pollock, Vande Sande and Priddy

[57] ABSTRACT

An aircraft fuel gauging system has a capacitance level probe mounted in a fuel tank that receives an alternating signal from a drive unit. The output of the level probe is connected to two diodes one of which is connected in series to earth and the other of which is connected in the opposite sense to a measuring unit. The measuring unit includes a signal conditioning unit which is switchable between operating as a d.c. current to voltage amplifier and a d.c. voltage amplifier by switching a resistor out of or into series connection with the diodes. A constant current source backs off the current from the probe when the tank is empty. Periodically, the supply of signals from the drive unit is interrupted and the conditioning unit is switched to operating as a d.c. voltage amplifier, the measuring unit measuring the voltage drop across the two diodes caused by current from the constant source. The current from the constant source may be increased when the resistor is connected in line such that the current through the diodes is substantially the same as the mean current during a.c. operation. The measuring unit may provide an indication of temperature derived from the voltage drop across the diodes.

10 Claims, 1 Drawing Figure

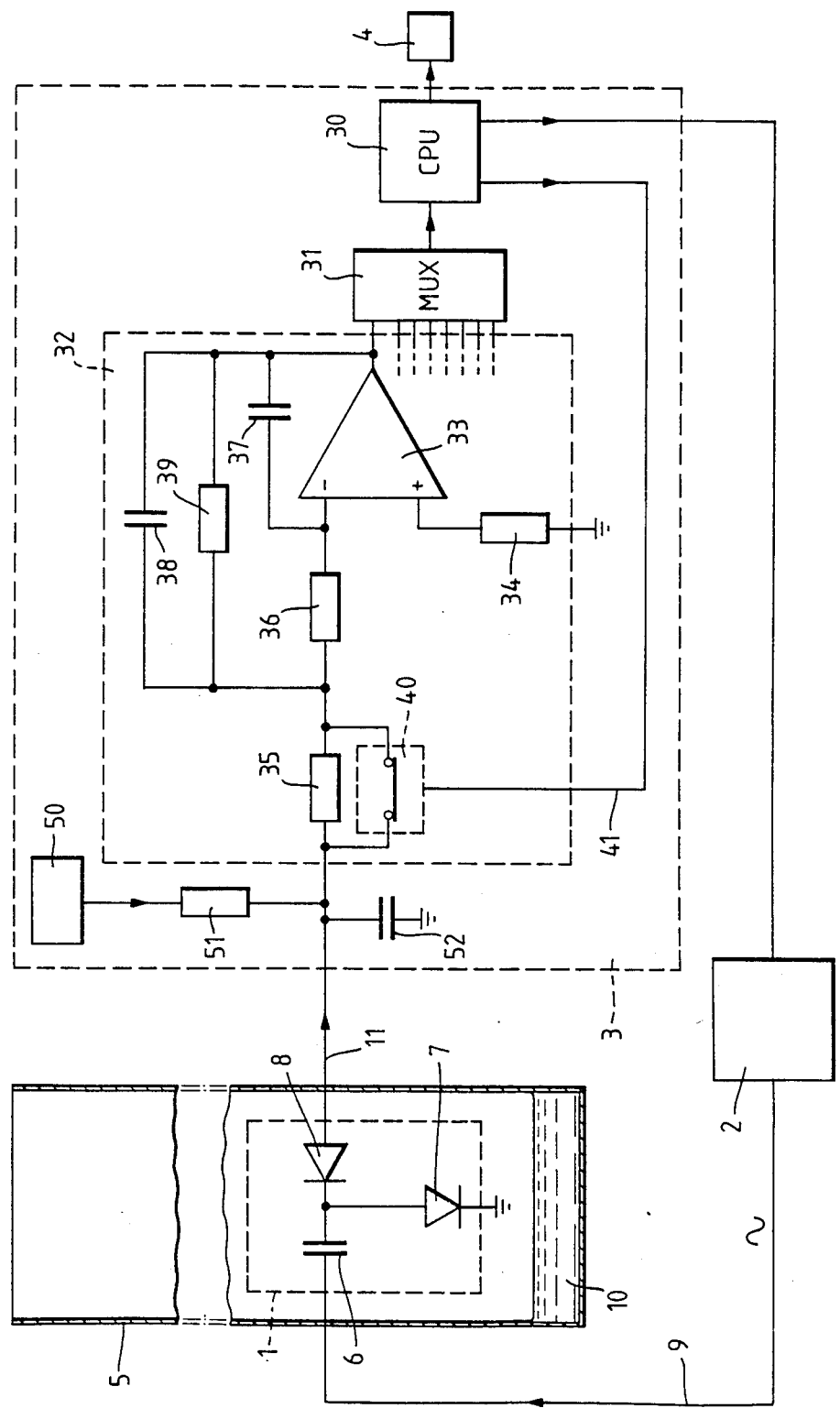

1

FLUID-GAUGING SYSTEMS

BACKGROUND OF THE INVENTION

This invention relates to fluid-gauging systems.

In capacitive fluid-gauging systems, the level of fluid in a reservoir is determined by sensing changes in the value of a capacitor located within the container. The capacitor has two plates, separated by an air- gap which is filled or emptied as the depth of fluid changes, thereby altering its capacitance. An alternating electric signal is supplied to the capacitor, and its output, after rectification, is supplied to a suitable measuring circuit.

The diodes used to rectify the output of the capacitor are mounted in the fluid tank and are subjected to the temperature changes of the fluid and air above the fluid. Typically, the temperature coefficient of such diodes is about $-2\text{mV}/°$ C. Since the voltage drop across the diodes affects the output of the capacitor sensor as supplied to the measuring circuit, it is usually necessary to compensate for this. Compensation may be achieved by use of a temperature sensor mounted close to the diodes and with knowledge of the temperature coefficient of the diodes.

This method of compensation has the disadvantage of requiring the use of additional components leading to increased complexity and reduced reliability. Also, the voltage drop across the diodes will be affected by other factors such as ageing which cannot be compensated by use of a temperature sensor.

BRIEF SUMMARY OF THE INVENTION

It is an object of the present invention to provide a fluid-gauging system that may be used to alleviate some at least of the disadvantages of the previous systems.

According to one aspect of the present invention there is provided a fluid-gauging system of the kind including a capacitive sensor unit comprising a capacitor and at least one unidirectional current device connected to the output of the capacitor, the capacitor being arranged for immersion within the fluid, means for supplying an alternating electric signal to the sensor unit such that the output of the sensor unit varies in accordance with change in fluid quantity, and measuring means arranged to receive the output of the sensor unit, the system including means for periodically interrupting the supply of alternating signal to the unidirectional current device, and means for supplying a steady current to the unidirectional current device, and the measuring means being arranged to derive an indication of voltage across the unidirectional current device when the supply of alternating signal is interrupted.

In this way, the voltage drop across the unidirectional current device can be periodically measured and this value used to compensate for temperature and other effects.

The system preferably includes two unidirectional current devices, one unidirectional current device being connected between the capacitor and the measuring means, and the other unidirectional current device being connected between the capacitor and earth in the opposite sense.

The measuring means may include amplifier means that is switchable between operating as d.c. current to voltage amplifier and a d.c. voltage amplifier. The measuring means may include resistor means connected in series with the or both unidirectional current devices, and switching means connected across the resistor means, the switching means being closed to by-pass the resistor means when the alternating signal is supplied to the sensor unit, and being opened when the alternating signal is interrupted so as thereby to increase the impedance of the measuring means.

The means for supplying a steady current is preferably arranged to back off current from the sensor unit when the capacitor is not immersed in fluid. The means for supplying a steady current may supply a steady current to the or both unidirectional current devices when the alternating signal is interrupted that is substantially equal to the mean current through the or both unidirectional current devices when supplied with the alternating signal. The supply of steady current may be arranged to increase when the alternating signal is interrupted such that the current through the or both unidirectional current devices is substantially equal to the mean current through the or both unidirectional current devices when supplied with the alternating signal.

The measuring means may be arranged to modify the indication of the voltage across the or both unidirection current devices obtained when the steady current is applied to the or both unidirectional current devices to obtain an indication of the voltage that would be present across the or both unidirectional current devices when the alternating signal is supplied to the or both unidirectional current devices. The measuring means may include processor means, the processor means containing information regarding the temperature coefficient of the or both unidirectional current devices, and the measuring means being arranged to provide an output representative of the temperature of the or both unidirectional current devices from the voltage across the or both unidirectional current devices.

The or both unidirectional current devices are preferably diodes. The capacitor in the sensor unit may have concentric tubular electrodes. The system may include a plurality of capacitive sensor units and may include a multiplex unit, the multiplex unit being arranged to receive the output from each of the plurality of capacitive sensor units.

According to another aspect of the present invention there is provided a method of deriving an indication of the voltage across a unidirectional current device in a fluid-gauging system including a capacitive sensor unit having a capacitor that is supplied with an alternating input signal and at least one unidirectional current device connected to receive the output of the capacitor, including the steps of interrupting the supply of the alternating signal to the unidirectional current device, applying a predetermined steady current to said unidirectional current device, and deriving an indication of the voltage across the unidirectional current device when the supply of alternating signal is interrupted.

A steady current is preferably applied to the said unidirectional current device when the alternating signal is not interrupted, to back off current from the sensor unit when the capacitor is not immersed in fluid. The steady current supplied to the unidirectional current device when the alternating signal is interrupted is preferably substantially equal to the mean current through the unidirectional current device when supplied with the alternating signal.

The supply of steady current may be increased when the alternating signal is interrupted such that the current through the unidirectional current device is substantially equal to the mean current through the unidirectional current device when supplied with the alternating signal. The indication of voltage across the unidirectional current device may be modified to obtain an indication of the voltage that would be present when the alternating signal is supplied to the unidirectional current device.

A fuel-gauging system and method, in accordance with the present invention, will now be described, by way of example, with reference to the accompanying drawing.

BRIEF DESCRIPTION OF THE DRAWING

The drawing shows the system schematically.

DETAILED DESCRIPTION

The fuel-gauging system includes a capacitive sensor unit 1, a drive unit 2 that provides an alternating signal to the sensor unit 1, and a measuring unit 3 that provides a d.c. output voltage to an indicator 4 in accordance with changes in the output from the sensor unit 1.

The sensor unit 1 is mounted within an aircraft fuel tank 5 and includes a capacitor 6 which is positioned at a suitable location for immersion in any fuel 10 present within the tank. The capacitor 6 may be of known form and have, for example, parallel plates or concentric tubes separated from one another by an air-gap which is filled with fuel to a depth dependent on the fuel level within the tank 5. As the fuel depth changes, the value of the capacitance correspondingly changes, and this change in capacitance is used to provide a measure of the fuel depth.

The sensor unit 1 also includes two diodes 7 and 8, one diode 7 having its anode connected to a plate of the capacitor 6 and its cathode connected to signal ground, and the other diode 8 having its cathode connected to the same capacitor plate and its anode connected via line 11 to the measuring unit 3. The other plate of the capacitor 6 is connected to the drive unit 2 via line 9.

The drive unit 2 is of a known kind, such as described in patent application No. GB 2 034 051A and is arranged to supply a sinewave signal to line 9 in which the product of the peak voltage $V_P$ and frequency f is a constant. The mean current $I_{mean}$ out of the sensor unit 1 is therefore given by:

$$I_{mean} = C_T f(2V_P - V_D) \tag{1}$$

where $V_D$ is the forward voltage drop across the two diodes 7 and 8; and $C_T$ is the value of the capacitor 6.

The measuring unit 3 includes a processing unit 30, which derives the output signals supplied to the indicator 4, and which receives at its input signals from a multiplex unit 31. The multiplex unit 31 has several inputs from different sensor units 1 in different tanks, only one of which is shown in the drawing. The input signals to the multiplex unit 31 are derived from respective signal conditioning units 32 which are switchable, under control of the processing unit 30 between operating as a d.c. current to voltage amplifier and operating as a d.c. voltage amplifier. The signal conditioning unit 32 includes an operational amplifier 33 having its positive input connected to earth via a resistor 34. Two resistors 35 and 36 are connected in series between line 11 and the negative input of the amplifier 33. A first capacitor 37 is connected across the amplifier 33 between its output and the junction of the resistor 36 with the amplifier's negative input. A parallel feedback arrangement of a second capacitor 38 and resistor 39 is connected between the junction between the two resistors 35 and 36 and the output of the amplifier 33.

The resistor 35 is normally short-circuited by a switch 40 which can be provided by a field-effect transistor, switching of the switch being controlled by signals from the processing unit 30 via line 41.

The measuring unit 3 also includes a voltage reference source 50 which is connected to line 11 via resistor 51 so as to provide a predetermined constant back-off current to the sensor unit 6. The voltage reference source 50 may be controllable to provide an increased current when testing the voltage drop across the diodes 7 and 8.

A capacitor 52 is connected between line 11 and signal ground to remove the majority of a.c. components of the signal from the sensor unit 1.

In normal operation, the drive unit 2 supplies an alternating signal to the sensor unit 1, and the output from the capacitor 6 is rectified and supplied to the measuring unit 3. The current produced by the voltage source 50 and the resistor 51 is used to back off the current from the sensor unit 6 when the tank 5 is empty of fuel. The resultant current on line 11 flows to the signal conditioning unit 32 by-passing the resistor 35 via the closed switch 40. The unit 32 produces a voltage output the gain of which is dictated by the value of the resistor 39. The voltage output from the unit 32 passes via the multiplexer 31 to the processing unit 30 where it is converted into a digital signal for processing.

Periodically, the processing unit 30 supplies signals to the drive unit 2 which causes it to interrupt the supply of alternating signals to the sensor unit 1. Simultaneously, the processing unit 30 supplies a signal via line 41 to open the switch 40 thereby bringing the resistance 35 into circuit and increasing the impedance of the signal conditioning unit 32, which is now reconfigured to a voltage amplifier, the voltage gain of which is dependent on the values of the resistances 35 and 39. Most of the current flowing through the resistor 51 flows now through the two diodes 8 and 7 in the sensor unit 1. This test current generates the diode forward voltage which is to be measured, the test current being approximately equal to the mean diode current under normal operation when the value of the capacitor 6 is being measured. This ensures that the diode forward voltage drop is measured near to the normal operating condition. Opening the switch 40 does cause a small drop in the current flowing through the diodes 7 and 8 from the voltage source 50. This may be compensated for, as mentioned above, by automatically increasing the voltage produced by the voltage source 50 in the testing mode.

The diode forward voltage drop thus generated is presented to the processor 30 after gain in the conditioning unit 32. The processor 30 adjusts the voltage drop thus produced to take into account: the gain of the amplifier 32, and the difference between the voltage drop across the diodes under static (d.c.) conditions from the drop under dynamic (a.c.) conditions met during normal gauging. In this respect, the processor 30 includes within it a model of the diodes 7 and 8. The processor 30 is thereby able to compute a value for the forward voltage drop $V_D$ that would occur in a dynamic situation, when gauging fuel quantity, and to use this in expression (1) above to derive the value of capacitance $C_T$. This in turn is processed in a known way to provide an indication of fuel level or other quantity which is independent of temperature or other effects, such as aging, on the diodes.

The system therefore enables a correction to be provided for the output signal from the sensor unit 1 during gauging. Where several sensor units are used, which all may be at different temperatures, a correction can readily be provided for the diodes in each sensor unit.

If the model of the diode in the processing unit includes information regarding its temperature coefficient, it is possible to obtain a measure of the temperature in each tank from the measure of the diode voltage drop. This can be utilised such as to compensate for changes in density of the fuel produced by temperature change or to provide a display of temperature.

Where the system is used with several sensor units, they can be used to provide an indication of the air temperature or of fuel temperature throughout the aircraft, depending on the extent to which the tanks contain fuel. Localised over-heating can also be detected.

The output from the processing unit 30 need not be used to provide a visual display of fuel quantity but could, for example, be used directly to control transfer of fuel between tanks or used in a flight management control system.

It will be appreciated that the invention is not restricted to fuelquantity gauging systems but could be used in other capacitance quantity gauging systems.

What we claim is:

1. A fluid-gauging system of the kind including a capacitive sensor unit comprising a capacitor and at least one unidirectional current device connected to the output of the capacitor, the capacitor being mounted for immersion within the fluid, a first electrical supply that supplies an alternating electric signal to the sensor unit such that the output of the sensor unit varies in accordance with change in fluid quantity, and a measuring unit connected to receive the output of the sensor unit, the improvement wherein the system includes means for causing the said first electrical supply periodically to interrupt the supply of alternating signal to the unidirectional current device, and a second supply of steady current, that supplies steady current to the unidirectional current device, and wherein the measuring unit derives an indication of voltage across the unidirectional current device when the supply of alternating signal is interrupted.

2. A fluid-gauging system according to claim 1, wherein the system includes two unidirectional current devices, means connecting one unidirectional current device between the capacitor and the measuring unit, and means connecting the other unidirectional current device between the capacitor and earth in the opposite sense.

3. A fluid-gauging system according to claim 1, wherein the measuring unit includes an amplifier and means for switching the amplifier between operating as a d.c. current to voltage amplifier and a d.c. voltage amplifier.

4. A fluid-gauging system according to claim 1, wherein the measuring unit includes a resistor means connected in series with the unidirectional current device, switching means connected across the resistor means, and means for closing the switching means to by-pass the resistor means when the alternating signal is supplied to the sensor unit, and for opening the switching means when the alternating signal is interrupted so as thereby to increase the impedance of the measuring unit.

5. A fluid-gauging system according to claim 1, wherein the said supply of steady current is arranged to back off current from the sensor unit when the capacitor is not immersed in fluid.

6. A fluid-gauging system according to claim 1, wherein the said supply of steady current supplies a steady current to the unidirectional current device when the alternating signal is interrupted that is substantially equal to the mean current through the unidirectional current device when supplied with the alternating signal.

7. A fluid-gauging system according to claim 6, wherein the said second supply of steady current increases the steady current when the alternating signal is interrupted such that the current through the unidirectional current device is substantially equal to the mean current through the unidirectional current device when supplied with the alternating signal.

8. A fluid-gauging system according to claim 1, wherein the measuring unit modifies the indication of the voltage across the unidirectional current device obtained when the steady current is applied to the unidirectional current device to obtain an indication of the voltage that would be present across the unidirectional current device when the alternating signal is supplied to the unidirectional current device.

9. A fluid-gauging system according to claim 1, wherein the measuring unit includes a processor, wherein said processor contains information regarding the temperature coefficient of the unidirectional current device and wherein the measuring unit provides an output representative of the temperature of the unidirectional current device from the voltage across the unidirectional current device.

10. A fluid-gauging system comprising: a capacitive sensor unit comprising a capacitor probe, means for mounting the capacitor probe for immersion in fluid, first and second diodes, means connecting first diode in one sense between the output of the capacitor and earth and means connecting one electrode of the second diode in the opposite sense to the output of the capacitor; a first electrical supply, said first supply supplying an alternating electrical signal to an input of the sensor unit such that the output of the sensor unit varies in accordance with change in fluid quantity; a measuring unit; and means connecting an input of the measuring unit to the other electrode of said second diode, the measuring unit including a second electrical supply that supplies a steady current to the other electrode of the second diode, means for periodically interrupting the supply of alternating signal to the sensor unit, and means for measuring the voltage across the two diodes caused by the current from the second supply when the supply of alternating signal to the sensor unit is interrupted.

* * * * *